United States Patent
Thaler et al.

(10) Patent No.: US 9,528,762 B2
(45) Date of Patent: Dec. 27, 2016

(54) NOZZLE BOTTOM ARRANGEMENT FOR A DRYER AND A METHOD FOR OPERATING SAID DRYER

(71) Applicant: ALSTOM Technology LTd, Baden (CH)

(72) Inventors: Bernd Thaler, Stuttgart (DE); Hans Peter Schommer, Althuette (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 540 days.

(21) Appl. No.: 13/963,258

(22) Filed: Aug. 9, 2013

(65) Prior Publication Data

US 2013/0318816 A1 Dec. 5, 2013

Related U.S. Application Data

(63) Continuation of application No. PCT/IB2012/000267, filed on Feb. 14, 2012.

(30) Foreign Application Priority Data

Feb. 15, 2011 (DE) .......................... 10 2011 000 734

(51) Int. Cl.
*F26B 3/00* (2006.01)
*F26B 17/00* (2006.01)
(Continued)

(52) U.S. Cl.
CPC .............. *F26B 17/10* (2013.01); *B01J 8/1818* (2013.01); *B01J 8/44* (2013.01); *F23K 1/00* (2013.01);
(Continued)

(58) Field of Classification Search
CPC ............ F26B 17/00; F26B 17/10; F26B 3/00; F26B 3/082; F26B 3/084; B01J 8/1818; F23K 2201/20; F27B 15/00; F23G 3/00; F16L 39/00; F16L 41/02; F16L 41/021
(Continued)

(56) References Cited

U.S. PATENT DOCUMENTS

| 3,605,275 A | 9/1971 | Enders |
| 3,954,390 A | 5/1976 | Akhundov et al. |

(Continued)

FOREIGN PATENT DOCUMENTS

| CN | 101601965 A | 12/2009 |
| DE | 3712166 A1 | 10/1987 |

(Continued)

*Primary Examiner* — Kenneth Rinehart
*Assistant Examiner* — John McCormack
(74) *Attorney, Agent, or Firm* — GE Global Patent Operation; Stephen G. Midgley (57) ABSTRACT

The invention relates to a nozzle bottom device and to a method for operating the latter. The nozzle bottom arrangement has a nozzle group with first nozzles and a further nozzle group with second nozzles. The two nozzle groups can be supplied independently of each other with a fluidizing medium. The respective volumetric flow can be switched on and off or can be adjusted variably. The first nozzles and the second nozzles are uniformly distributed over the entire surface of the nozzle bottom arrangement. As a result, a homogeneous fluidized bed is produced in the fluidized bed dryer irrespective of whether only one of the nozzle groups or all of the nozzles is or are operated.

17 Claims, 6 Drawing Sheets

(51) Int. Cl.
  *F26B 17/10* (2006.01)
  *B01J 8/18* (2006.01)
  *B01J 8/44* (2006.01)
  *F23K 1/00* (2006.01)
  *F26B 3/08* (2006.01)

(52) U.S. Cl.
  CPC ...... *F26B 3/082* (2013.01); *B01J 2208/00902* (2013.01); *F23K 2201/20* (2013.01)

(58) Field of Classification Search
  USPC ............ 34/487, 492, 585, 579, 582; 432/58; 110/243–245; 138/39, 115, 116, DIG. 11, 138/177, 178; 137/594, 561 A
  See application file for complete search history.

(56) References Cited

U.S. PATENT DOCUMENTS

| | | | |
|---|---|---|---|
| 4,226,830 A | 10/1980 | Davis | |
| 4,521,976 A | 6/1985 | Stewart et al. | |
| 4,628,831 A * | 12/1986 | Delessard | B01J 8/1818 110/245 |
| 4,843,050 A * | 6/1989 | Rahlwes | C10G 11/182 208/164 |
| 5,771,696 A * | 6/1998 | Hansel | F23R 3/283 60/739 |
| 6,298,579 B1 * | 10/2001 | Ichitani | B03B 4/00 209/154 |
| 2011/0000406 A1 | 1/2011 | Eriksson et al. | |

FOREIGN PATENT DOCUMENTS

| | | |
|---|---|---|
| EP | 0 819 900 | 1/1998 |
| EP | 0 819 901 | 1/1998 |
| EP | 0 819 903 | 1/1998 |
| GB | 1137628 A | 12/1968 |
| GB | 2022226 A | 12/1979 |
| SU | 1343182 A1 | 10/1987 |
| SU | 1629711 A1 | 2/1991 |

* cited by examiner

NOZZLE BOTTOM ARRANGEMENT FOR A DRYER AND A METHOD FOR OPERATING SAID DRYER

CROSS-REFERENCE TO RELATED APPLICATIONS

This application claims priority to PCT/IB2012/000267 filed Feb. 14, 2012, which in turn claims priority to German Application 102011000734.2 filed Feb. 15, 2011, the contents of which are each incorporated in their entirety.

TECHNICAL FIELD

The invention relates to a nozzle bottom arrangement for a dryer, in particular a fluidized bed dryer. The dryer serves to dry ground or comminuted solid material supplied to the dryer chamber. The solid particles have a size of a few millimeters or less. Said solid particles have a moisture which is at least reduced by the dryer. For example, the solid particles may be pit-wet solid particles, for example brown coal, the moisture content of which is to be reduced prior to combustion.

BACKGROUND

A drying system of this type for brown coal is known, for example, from EP 0 819 900 A1. The dryer has a dryer chamber in which a heat exchanger unit is arranged. A nozzle bottom arrangement is located below the heat exchanger unit. The dried brown coal is taken out of the dryer chamber below the nozzle bottom arrangement. The nozzle bottom arrangement has two nozzle bottom segments which each have a distributor chamber and nozzle bars connected thereto in a row and located parallel next to one another. The nozzle bars of the two nozzle bottom segments are pushed laterally into the dryer chamber and are located next to one another on both sides of the central longitudinal plane of the dryer. A partition is arranged between the two nozzle bottom segments. A plurality of nozzles for ejecting the fluidizing medium are arranged on each nozzle bar. Purified hydrocarbon vapor is supplied as the fluidizing medium. The introduced quantity of hydrocarbon vapor and the approach flow velocity are controlled in such a manner that a homogeneous fluidized bed is produced in the region above the heat exchanger unit.

Dryers with a nozzle bottom arrangement of the type mentioned at the beginning are also known, for example, from EP 08 19 901 A1 and EP 0 819 903 A1.

Starting from the known nozzle bottom, it can be considered to be the object of the present invention to enable better adaptation of the operating state of the nozzle bottom arrangement to the current operating state of the dryer.

This object is achieved by a nozzle bottom arrangement with the features of patent claim 1 and by a method for operating the nozzle bottom arrangement with the features of patent claim 18.

SUMMARY

According to the invention, a nozzle bottom arrangement with at least one nozzle bottom segment is provided. The nozzle bottom segment has a multiplicity of first nozzles and a multiplicity of second nozzles. A first fluid flow of the fluidizing medium can be supplied to the first nozzles. Independently thereof, a fluid flow of identical or differing size can be supplied to the second nozzles. The fluid flow can be defined, for example, as a volumetric flow or as a mass flow. The first nozzles and the second nozzles are in particular uniformly distributed over the entire surface of the nozzle bottom segment. Irrespective of whether only the first nozzles, the second nozzles or all of the nozzles are used at the same time for fluid ejection, a uniform discharge of the fluidizing medium for producing the fluidized bed is achieved as a result over the entire nozzle bottom segment. In the simplest case, the nozzle bottom arrangement can be operated in two stages, as it were. Either only the first or only the second nozzles are supplied with fluid, or all of the nozzles are supplied with fluid. If the number of first nozzles is not equal to the number of second nozzles, a three-stage operation with a differing number of nozzles ejecting fluidizing medium can thereby also be realized. It goes without saying that, in each operating stage, the volumetric flow or the mass flow to the nozzles used in each case can also be adjustable. For this purpose, use may be made, for example, of proportional valves. In a simple refinement, pure shut-off valves may also be present on the nozzle bottom arrangement, said shut-off valves merely opening up or shutting off the supply to the first nozzles and/or the second nozzles. Instead of two nozzle groups, three or more nozzle groups which can be activated fluidically independently of one another may also be present per nozzle bottom segment, as a result of which the number of operating states or operating stages for adjusting the volumetric or mass flow of the fluidizing medium output by the nozzle bottom segment can be increased.

A nozzle bottom arrangement according to the invention can be adapted to different operating states of the dryer. Fluidized bed dryers can be operated at atmospheric pressure or in a pressure-charged manner with a positive pressure of up to approximately 5 bar. The nozzle bottom arrangement present creates the possibility, for all of the operating states and also for the approach to and exit from the fluidized bed dryer, of delivering the volumetric or mass flow adapted thereto in order to produce the fluidized bed. In addition, a uniform distribution of the fluid over the entire surface of the at least one nozzle bottom segment is ensured. Owing to the fact that the number of active nozzles, via which the fluid is ejected in order to produce the fluidized bed, varies, the necessary volumetric or mass flow of the fluidizing medium can be output without undesirably large pressure changes being required in the fluid line system of the nozzle bottom arrangement. Excess pressures of the fluidizing medium at the nozzles and erosion problems because of excessive exit velocities can consequently be avoided.

In an advantageous embodiment, two rows of nozzles are arranged on a nozzle bar. The two rows are located in particular on opposite sides with respect to the central longitudinal plane through the nozzle bar. This enables a great density of nozzles to be achieved on the surface of the nozzle bottom segment, and nevertheless there is sufficient space for the dried solid particles to be able to pass through the nozzle bottom segment and the nozzle bottom arrangement.

The nozzle bars can run parallel to one another or can be arranged crosswise in two or more planes. Even with the crosswise arrangement, a great density of the nozzles on the surface of the nozzle bottom segment is achieved.

It is advantageous if the nozzle bottom segment has a plurality of nozzle bars which run substantially parallel to one another and on which nozzles of both nozzle groups, i.e. first nozzles and second nozzles, are in each case arranged.

In this case, a first nozzle channel and, fluidically separated therefrom, a second nozzle channel can run in the nozzle bar. The first nozzles open into the first nozzle channel, and the second nozzles open into the second nozzle channel. A row of first nozzles and a row of second nozzles can therefore be arranged in a simple manner directly adjacent to each other on a nozzle bar. A plurality of said nozzle bars of the nozzle bottom segment then ensure that the first nozzles and the second nozzles are distributed over the entire surface of the nozzle bottom segment. The nozzle bar may be designed, for example, as a pipe, wherein the two nozzle channels can be separated fluidically from each other in the interior of the pipe by a common partition. A pipe of this type can be produced in a simple manner by two pipe half shells and a partition which lies in between and extends in a plane.

In order to achieve an arrangement of first and second nozzles distributed over the nozzle bottom segment, it would also be possible, in a modification thereto, to provide the nozzle bars running next to one another with first and second nozzles in an alternating manner.

In order to avoid coal deposits on the nozzle bars, it is advantageous if the height measured in the vertical direction in the use position of the nozzle bar is greater than the width of said nozzle bar at right angles to the vertical direction. The tubular nozzle bar may have, for example, an almond-shaped cross-sectional form. Other oval or elliptical cross-sectional forms are also possible.

In one embodiment, the number of first nozzles and the number of second nozzles on a nozzle bar is identical. The volumetric flow through the first nozzles and the second nozzles of a nozzle bar can thereby be uniformly adjusted in a very simple manner. If only one of the two nozzle groups is required, said nozzle groups can also be used in an alternating manner in order to achieve uniform wear of all of the nozzles and therefore to increase the service life of the nozzle bottom arrangement. As an alternative thereto, it would also be possible to select the number of first nozzles so as to differ from the number of second nozzles. This in turn has the advantage that, depending on whether fluidizing medium is supplied to the first nozzles or the second nozzles or both to the first and to the second nozzles, the volumetric flow or the mass flow can be adjusted in a very simple manner in at least three stages.

In a preferred embodiment, the nozzles are screwed onto the nozzle bar. The nozzles can very easily be removed as a result, for example for maintenance or for exchanging a defective nozzle.

It is advantageous if the first nozzles and the second nozzles are offset with respect to one another in the longitudinal direction of the nozzle bar. In this case, it is of advantage if the first nozzles are arranged on one side and the second nozzles are arranged on the other side in each case with respect to the longitudinal central plane of the nozzle bar. As a result, the first and second nozzles can be arranged very tightly next to one another. In addition, good accessibility to the nozzles and in particular to the screw connection between nozzle and nozzle bar is ensured. Furthermore, despite the nozzles being arranged tightly next to one another, the distance between adjacent nozzle bars remains of a size sufficient to provide a passage for the solid particles.

In addition, it is expedient if the nozzle bar is closed fluidically at one end. This enables the nozzle bottom segments to be arranged very slightly abutting against one another or adjacent to one another on a plane on opposite sides in the dryer chamber. The nozzle channels running in the nozzle bar are sealed in a fluid-tight manner at said end.

At the opposite end, the nozzle bar preferably has an inlet mouth for the supply of the fluidizing medium. Fastening means for releasably connecting the nozzle bar to a further component are preferably provided at the inlet mouth. For example, a flange can serve as the fastening means. Via said fastening means, the nozzle bar can very easily be removed and, if required, serviced and/or exchanged. Said nozzle bar is mechanically connected preferably to a connecting piece via the fastening means. When a mechanical connection is produced, a fluidic connection is also produced between two connecting channels of the connecting piece and the two nozzle channels.

As an alternative to closing the nozzle bars in a fluid-tight manner on one side, there is also the option of feeding fluidizing medium into the nozzle bar from both sides in order to supply the nozzles. The flow can then pass continuously and on both sides through the nozzle channel or the nozzle channels in the nozzle bar.

For the fluidic connection of the connecting piece to an associated distributor chamber, a distributor line can open in each case into the connecting channels. The distributor chambers serve to distribute the predetermined volumetric flow or mass flow of the fluidizing medium uniformly to the nozzle group connected in each case. For this purpose, the cross section of the distributor chamber can decrease from a supply point, at which fluidizing medium is supplied via a distributor line, in one or in more directions in which the distributor chamber extends.

At least one supply chamber which serves as a first distributor stage upstream of the distributor chambers can be provided for the supplying of one or more nozzle segments. One or more supply lines of the assigned distributor chambers open into the supply chamber.

A valve arrangement is preferably provided for controlling or regulating the volumetric flow or the mass flow of the fluidizing gas to the first nozzles and/or to the second nozzles. The valve arrangement can in each case have an activatable valve in the supply line to each distributor chamber. The valve may be a switching valve or else a proportional valve. The valves in the supply lines can be activated independently of one another, and therefore the volumetric flow or mass flow into the distributor chambers can in each case be adjusted separately. The arrangement of the valves upstream of the distributor chambers in the flow direction ensures that the fluidizing medium flowing to the distributor chambers is distributed uniformly to the nozzles connected fluidically in each case.

BRIEF DESCRIPTION OF THE DRAWINGS

Advantageous refinements of the nozzle bottom arrangement and of a method for operating the nozzle bottom arrangement emerge from the dependent patent claims and the description. The description explains essential features of the invention with reference to a preferred exemplary embodiment. The drawing should be used as a supplement. In the drawing:

DETAILED DESCRIPTION

Figure 1:
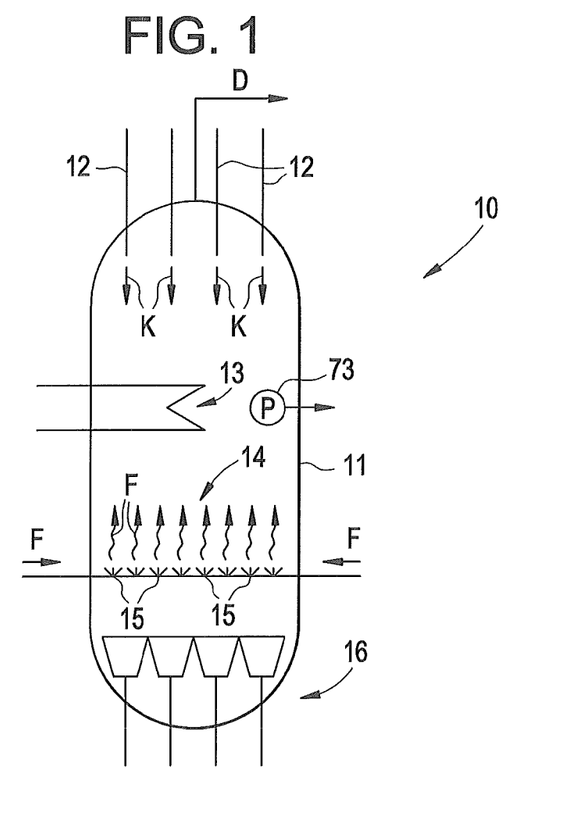
FIG. 1 shows a highly simplified block diagram of an embodiment of a fluidized bed dryer with a nozzle bottom arrangement.

FIG. 1 illustrates a block diagram of a dryer in the form of a fluidized bed dryer 10 in a highly simplified manner. The fluidized bed dryer 10 has a dryer chamber 11 into which, in the use position, a solid matter which is to be dried and is in the form of small solid particles K is supplied from above via at least one filling line 12. The moisture contained in the solid particles K is intended to be reduced via the fluidized bed dryer 10. In the exemplary embodiment, the solid matter to be dried is coal K, in particular pit-wet brown coal.

A heat exchanger unit 13 is arranged in the dryer chamber 11, said heat exchanger unit supplying heat to the solid particles K by means of contact, as a result of which the water contained in the solid particles K at least partially evaporates and is removed from the dryer chamber 11 in the form of exhaust vapors D.

A homogeneous fluidized bed is intended to be produced in the region of the heat exchanger unit 13 in order to increase the residence period of the coal particles K. For this purpose, there is a nozzle bottom arrangement 14 in the dryer chamber 11 below the heat exchanger unit 13. The nozzle bottom arrangement 14 has a multiplicity of nozzles 15 via which a fluidizing medium F and, for example, a fluidizing gas is ejected. Nitrogen, air, water vapor or a mixture of nitrogen with air or water vapor can be used as the fluidizing medium. The filtered exhaust vapor D may also serve as the fluidizing medium F.

Below the nozzle bottom arrangement 14 in the dryer chamber 11 there is a take-off device 16 via which the dried coal particles can be taken out of the dryer chamber 11 and supplied, for example, to a cooler, a store or a combustion chamber for immediate combustion in a power station.

Figure 2:
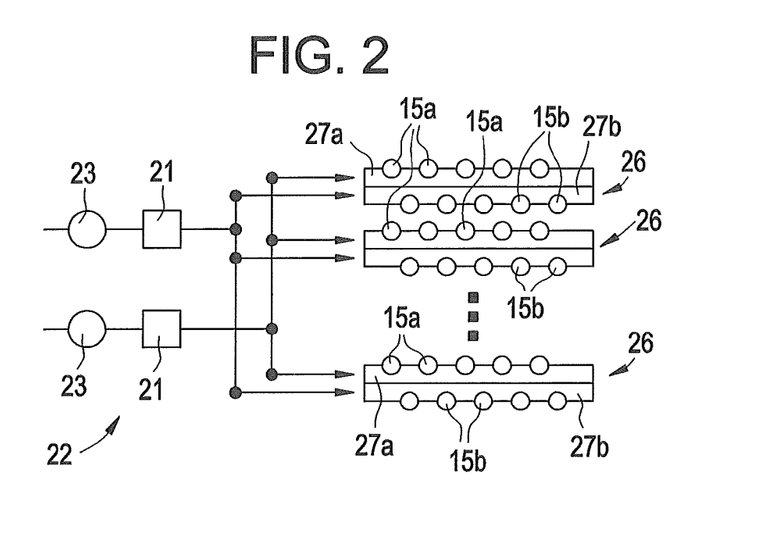
FIG. 2 shows a block diagram of the fluid flow of a fluidizing medium to the nozzle bars of one embodiment of a nozzle bottom segment.
Figure 3:
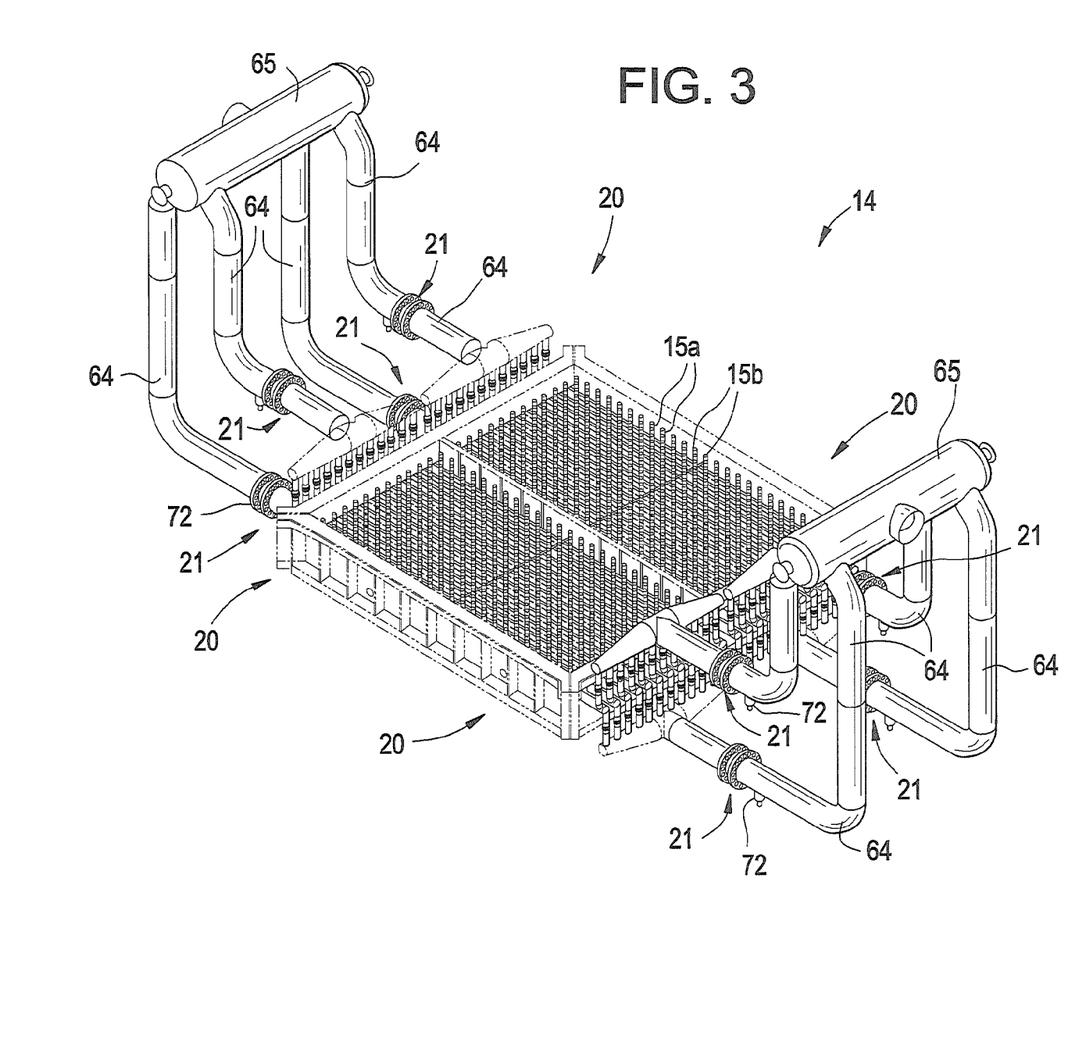
FIG. 3 shows a perspective illustration of a preferred embodiment of a nozzle bottom arrangement.

In the preferred exemplary embodiment, the nozzle bottom arrangement 14 has a plurality of and, according to the example, four nozzle bottom segments 20. Each nozzle bottom segment 20 has a first nozzle group with a multiplicity of first nozzles 15a and a second nozzle group with a multiplicity of second nozzles 15b. The first nozzles 15a and the second nozzles 15b can output fluidizing gas F independently of one another. The volumetric or mass flow output via the first nozzles 15a can therefore be different from the volumetric or mass flow of the fluidizing medium F output via the second nozzles 15b. For this purpose, a valve 21 of a valve arrangement 22 is assigned in each case to the first nozzles 15a and to the second nozzles 15b of a nozzle bottom segment 20. In the simplest case, the valves 21 can be designed as switching valves. As an alternative, use may also be made of proportional valves in order to be able to control or regulate the volumetric or mass flow within predefined limits. If a regulation is intended to take place, a flow sensor 23 for detecting the measured values of the volumetric or mass flow is present in the flow path upstream or downstream of the valve 21. The valves 21 can be activated independently of one another. For this purpose, a control device can be provided, by means of which the measured values can be supplied to the flow sensors 23 for regulation purposes. The control device is not illustrated specifically.

Figure 4:
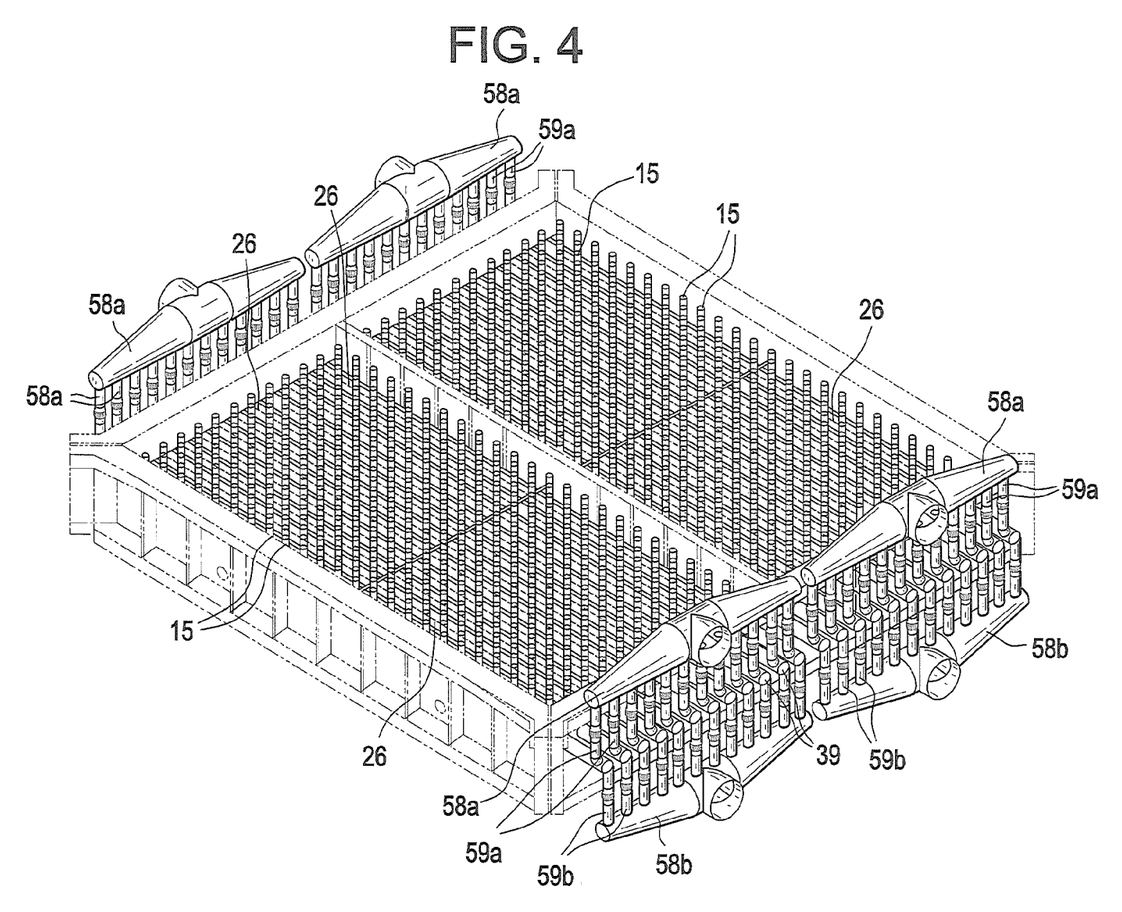
FIG. 4 shows a perspective illustration of the preferred exemplary embodiment of the nozzle bottom segments according to FIG. 3 with the nozzle bars and the distributor chambers.

The first nozzles 15a and the second nozzles 15b are distributed uniformly over the entire surface of the nozzle segment 20. Each nozzle segment 20 has a plurality of nozzle bars 26 arranged parallel to one another. The nozzle bars 26 bear the nozzles 15 which, in the exemplary embodiment, are arranged in two rows along the nozzle bar. In order to achieve a regular distribution both of the first nozzles 15a and of the second nozzles 15b, it is provided according to the example that a number of first nozzles 15a and a number of second nozzles 15b are arranged on each nozzle bar 26. The number of first nozzles 15a and of second nozzles 15b on a common nozzle bar 26 is preferably identical. The number of nozzle bars 26 per nozzle segment 20 may vary. In the exemplary embodiment, the number of nozzle bars 26 corresponds to the number of first nozzles 15a and to the number of second nozzles 15b per nozzle bar 26. For example, twelve nozzle bars 26 each having twelve first nozzles 15a and twelve second nozzles 15b per nozzle segment 20 can be provided. By means of this configuration of the nozzle bar 26, the first nozzles 15a and the second nozzles 15b can be arranged very tightly next to one another. Nevertheless, sufficient free space remains in the nozzle bottom arrangement 14 such that the solid particles K can pass through the nozzle bottom arrangement 14. This is required in order not to obstruct the solid particles K on the path to the take-off device 16 and to avoid heavy deposition of the particles on the nozzle bottom arrangement 14.

Figure 5:
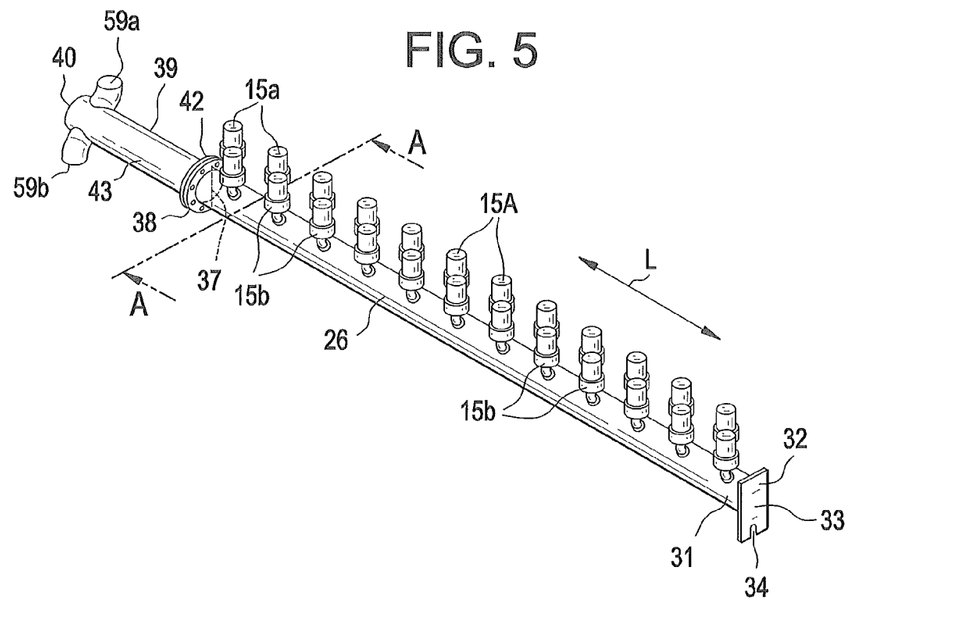
FIG. 5 shows a preferred exemplary embodiment of a nozzle bar with first and second nozzles and a connecting piece connected to said nozzle bar, in a perspective illustration.
Figure 7:
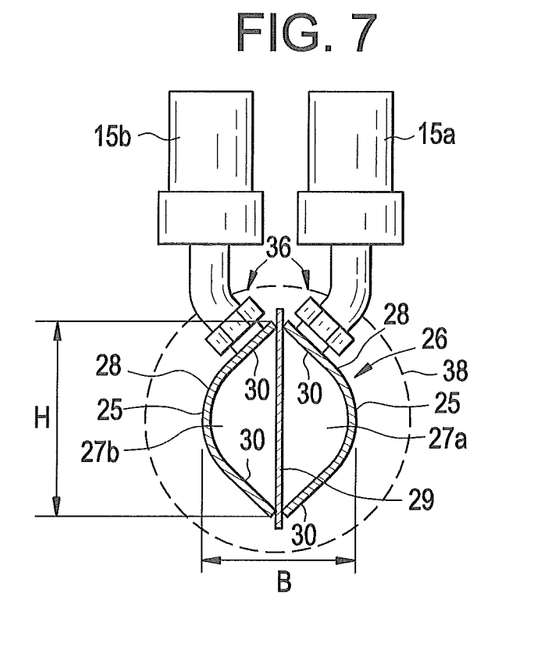
FIG. 7 shows a cross section through the nozzle bar from FIG. 5 according to the section line A-A.

The nozzle bar 26 is designed as a tubular body and is hollow on the inside. A first nozzle channel 27a and, adjacent thereto, a second nozzle channel 27b runs along the entire nozzle bar 26. The first nozzles 15a of the nozzle bar 26 are fluidically connected to the first nozzle channel 27a. The second nozzles 15b of the nozzle bar 26 are fluidically connected to the second nozzle channel 27b. The two nozzle channels 27a, 27b are fluidically separated from each other.

In the exemplary embodiment, the nozzle bar 26 has an almond-shaped contour, as viewed in cross section. The height H of the nozzle bar 26 is greater than the width B of said nozzle bar at right angles thereto. In the use position, the height direction in which the height H is measured runs in the vertical direction. Owing to the smaller width B in comparison to a circular cross section of identical cross-sectional area, deposits of solid particles K on the nozzle bar 26 are reduced. The required flow cross section is achieved by the specification of the height H. In a departure from the form illustrated in FIG. 7, the cross-sectional contour of the nozzle bar 26 may also have other non-circular forms.

In the exemplary embodiment, the nozzle bar consists of two half shells 28 which each have a groove shape. Said two half shells 28 are fastened in a fluid-tight manner from opposite sides to a partition 29 extending in a longitudinal central plane. As a result, the two nozzle channels 27a and 27b are formed between each half shell 28 and the partition 29. On the two connecting regions to the partition 29, the two half shells 28 each have an edge section 30 running in a substantially planar manner, the edge sections approximately enclosing an angle of 35° to 55° and preferably 45° in relation to the partition 29. The two edge sections 30 of a half shell 28 are connected to each other by a central part curved in the form of an arc of a circle.

The nozzles 15 are arranged along the nozzle bar 26 in the vertically upper region. In the exemplary embodiment, the flow channels 35 of the nozzles 15 open in the region of the upper edge section 30 into the respectively assigned nozzle channel 27a, 27b. The first nozzles 15a are arranged on one side and the second nozzles 15b are arranged on the respectively other side with regard to the central longitudinal plane or the plane in which the partition 29 of the nozzle bar 26 extends. The first nozzles 15a therefore sit on one half shell 28 while the second nozzles 15b are fitted to the respectively other half shell 28 of the nozzle bar 26. The nozzles 15 are connected to the nozzle bars via screw connections 36. As a result, the nozzles 15 can be removed when required from the nozzle bar 26 and serviced, repaired or exchanged. The first nozzles 15a are offset in relation to the second nozzles 15b, as seen in the longitudinal direction L of the nozzle bar 26. The first and second nozzles are therefore arranged in an alternating manner in the longitudinal direction L, as seen from the side facing the nozzle bar 26.

The nozzle bar 26 is sealed in a fluid-tight manner at the one, inner end 31 thereof. In the preferred exemplary embodiment, said nozzle bar there has a plate-like sealing element 32 which extends substantially transversely with respect to the longitudinal axis of the nozzle bar 26. The sealing element 32 has a bearing surface 33 oriented away from the nozzle bar 26. The bearing surfaces 33 of two nozzle bars 26, which are aligned in the longitudinal direction L, of different nozzle bottom segments 20 can be placed onto one another. Means for fastening two sealing elements 32 bearing against each other, for example a recess 34, can also be provided on the sealing element 32 such that a connecting pin or a screw can be plugged through the aligned recesses 34 of two sealing elements 32. The nozzle bars 26 of two nozzle bottom segments 20, which are introduced into the dryer chamber 11 from opposite sides, can thereby be mechanically connected to one another.

Figure 9:
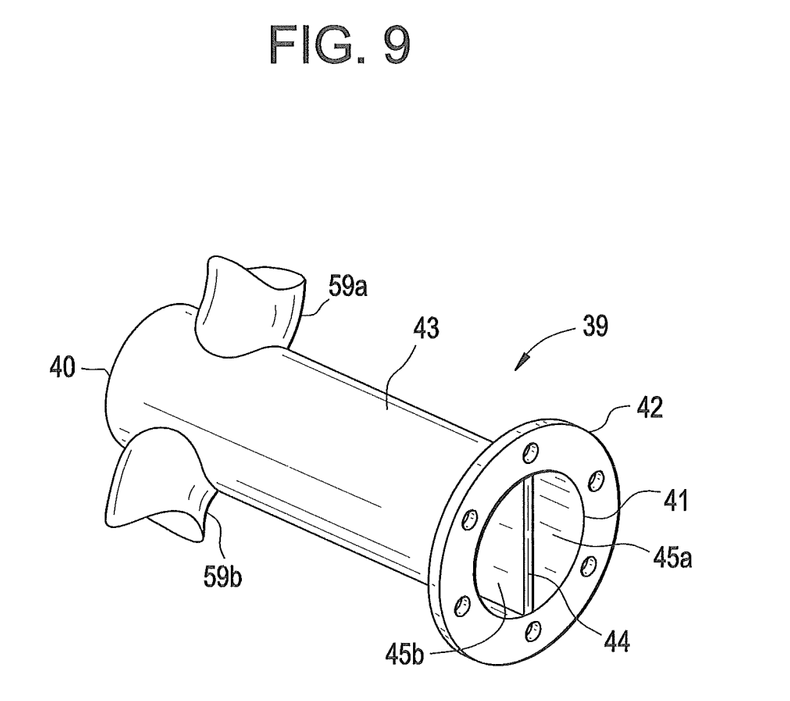
FIG. 9 shows a perspective illustration of the connecting piece from FIG. 5.

At the end thereof opposite the sealing element 32, the nozzle bar 26 has an inlet mouth 37 which is divided by the partition 29 into a mouth part for the first nozzle channel 27a and a mouth part for the second nozzle channel 27b. Around the inlet mouth 37 there is an annular flange 38 which serves to releasably connect the nozzle bar 26 to a connecting piece 39. The connecting piece 39 has a hollow pipe body 43 which is closed axially in a fluid-tight manner at its outer end 40. At its end opposite the outer end 40, the pipe body 43 of the connecting piece 39 has an outlet mouth 41. The outlet mouth 41 is surrounded by a flange 42 of the connecting piece 39. The connecting piece 39 can be releasably connected to the annular flange 38 of the nozzle bar 26 via the flange 42, according to the example via a screw connection. Sealing means which are not illustrated specifically for the sake of clarity may be provided in the region of the flange connection.

The interior of the pipe body 43 of the connecting piece 39 is fluidically divided by a wall 44 into a first connecting channel 45a and a second connecting channel 45b. When a mechanical connection is produced between the connecting piece 39 and the assigned nozzle bar 26, a continuous fluidic connection is produced between the first connecting channel 45a and the assigned first nozzle channel 27a and between the second connecting channel 45b and the assigned second nozzle channel 27b. In this case, the partition 29 is connected in a fluid-tight manner to the wall 44 of the connecting piece 39.

Figure 8:
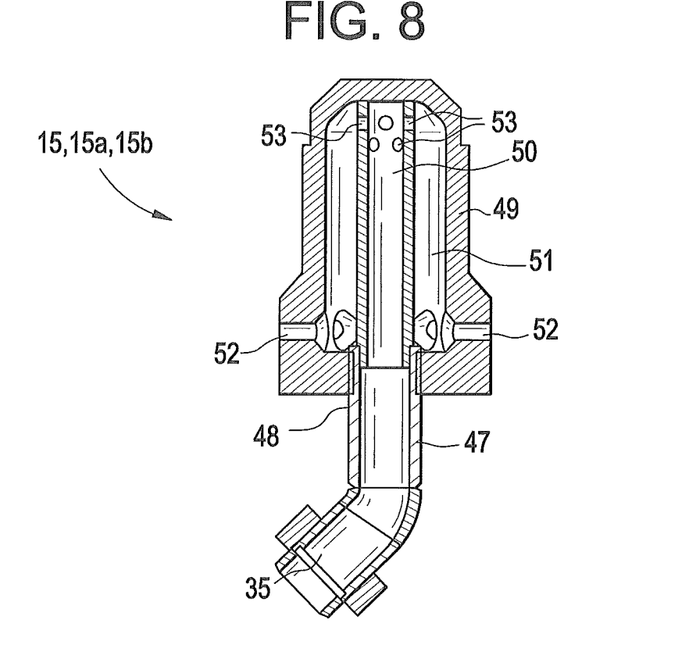
FIG. 8 shows a cross section through a preferred embodiment of a nozzle.

FIG. 8 illustrates an exemplary embodiment of a nozzle 15 in cross section. The first nozzles 15a and the second nozzles 15b are of identical configuration. A curved nozzle pipe 47 bounds the flow channel 35 of the nozzle 15. The bending of the nozzle pipe 47 is designed in such a manner that the flow channel 35, which runs obliquely from the nozzle bar 26, runs substantially vertically in an upper pipe section 48 in the use position of the nozzle bottom arrangement 14. A nozzle cap 49 is placed, and in particular screwed, onto the upper pipe section 48. The nozzle cap 49 has a central passage 50 which is fluidically connected to the flow channel 35. The central passage 50 is surrounded by an annular space 51. In the region of the connecting point between the nozzle pipe 47 and the nozzle cap 49 there are radial nozzle openings 52 which run radially with respect to the central longitudinal axis of the central passage 50 and open outward. At the end opposite the nozzle pipe 47, the central passage 50 is fluidically closed axially by the nozzle cap 49. At said end, passage openings 53 which produce a fluidic connection between the central passage 50 and the annular space 51 are provided on a wall of the nozzle cap 49, the wall enclosing the central passage 50. The fluidizing medium F conveyed via the nozzle channels 27a, 27b can flow through the flow channels 35 in the central passage 50, can continue via the passage openings 52 into the annular space 51 and can emerge from there out of the nozzle openings 52.

In the exemplary embodiment, each nozzle bottom segment 20 is assigned two distributor chambers 58. The number of distributor chambers 58 corresponds to the number of nozzle groups present. A first distributor chamber 58a serves to distribute the fluidizing medium F to the first nozzles 15a of the nozzle bottom segment 20 and a second distributor chamber 58b serves to distribute the fluidizing medium F to the second nozzles 15b of the same nozzle bottom segment 20.

Figure 6:
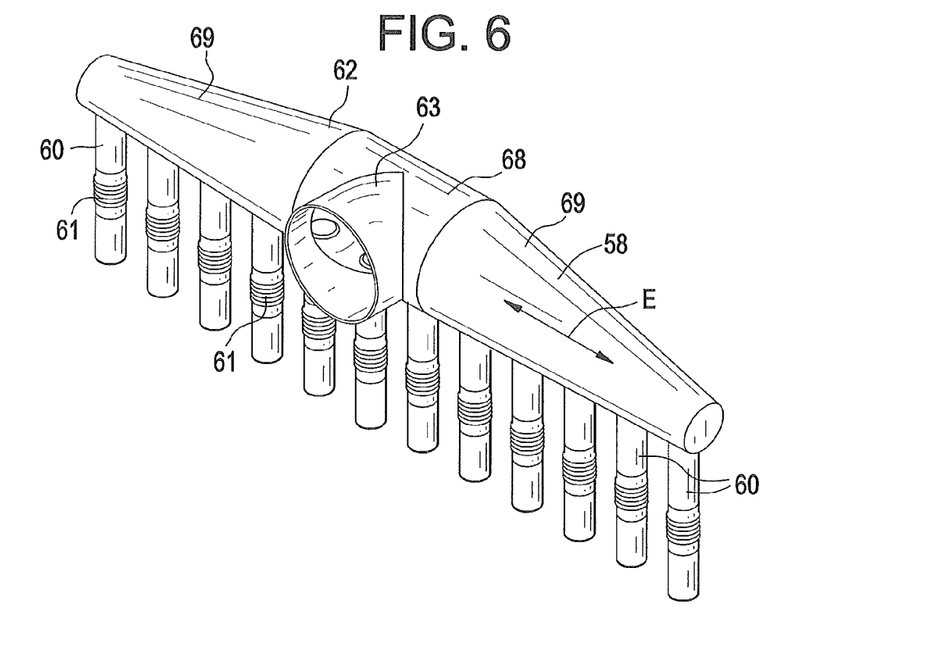
FIG. 6 shows an exemplary embodiment of a distributor chamber in a perspective illustration.

The first distributor chamber 58a and the second distributor chamber 58b are connected to the first nozzles 15a and the second nozzles 15b via the connecting pieces 39 and the nozzle bars 26 which are connected thereto. Each connecting piece 39 is therefore fluidically connected to the first distributor chamber 58a via a first distributor line 59a and to the second distributor chamber 58b via a second distributor line 59b. The first distributor line 58a opens into the first connecting channel 45a and the second connecting line 59b opens into the second connecting channel 45b. The distributor lines 59a and 59b open radially into the connecting piece 39 in the region of the outer end 40. The distributor lines 59a and 59b run away approximately radially from the connecting piece 39 in opposite directions toward the respectively assigned distributor chamber 58a and 58b. In the use position, said distributor lines extend primarily in the vertical direction. In the exemplary embodiment, the distributor lines 59a and 59b are divided into two axial sections which are connectable releasably to each other, for example via a screw connection. Those axial sections 60 of the distributor lines 59a, 59b which are assigned to a distributor chamber 58 therefore each have an external thread 61 which can be screwed to a nut of the respectively assigned other axial section of the connecting piece 39.

Those axial sections 60 of the distributor lines 59 which are connected fixedly to the distributor chamber 58 are arranged next to one another in a row at a uniform spacing. The distributor chamber 58 extends transversely with respect to the direction of extension of the axial sections 60 and, according to the example, approximately horizontally when the nozzle bottom arrangement is in the use position.

The distributor chamber 58 is surrounded by a pipe-like distributor body 62. Approximately centrally, the distributor body 62 has a connecting stub 63 which serves for the connection to a supply line 64. The supply line 64 leads to a supply chamber 65. In the exemplary embodiment, a plurality of distributor lines 64 and consequently a plurality of distributor chambers 58 are fluidically connected to a supply chamber 65. The supply chamber 65 serves to store the fluidizing medium F for one or more nozzle bottom segments 20, according to the example for two nozzle bottom segments 20 in each case.

As can be seen in FIG. 3, in the exemplary embodiment the valves 21 for controlling the volumetric flow or mass flow of the fluidizing medium F supplied to a distributor chamber 58 are inserted into the supply lines 64. In addition, the flow sensors 23 can be arranged in the supply lines 64 upstream or downstream of the valves 21. This enables the volumetric or mass flow into the respectively assigned distributor chamber 58 to be regulated by a supply line 64.

In order to uniformly distribute the fluidizing gas F flowing into the distributor chamber 58 to the respectively connected first nozzles 15a and second nozzles 15b, the cross section of the distributor chamber 58 tapers from the connecting stub 63 in the direction of extension E of the distributor chamber 58. In the region of the connecting stub 63, the distributor body 62 has a hollow-cylindrical central section 68, the longitudinal axis of which is oriented in the direction of extension E. Said central section 68 is adjoined on both sides by a distributor piece 69, the cross section of which continuously decreases from the central section 68 in the direction of extension E. In the exemplary embodiment, the distributor piece 69 tapers conically. It has, for example, a frustoconical outer and inner contour.

The internal cross section of the distributor chamber 58 therefore continuously decreases in the flow direction of the fluidizing medium F within the distributor chamber 58. In the direction of extension E, the axial sections 60 are arranged lying next to one another and open into the distributor chamber 58. The volume of the fluidizing medium F therefore continues to decrease from the supply point at the connecting stub 63 in the direction of extension E because of the discharge into the distributor lines 59a, 59b. The tapering cross section of the distributor chamber 58 makes it possible to ensure the necessary pressure for supplying the fluidizing gas F to the nozzle bars 26, and therefore a uniform ejection of the fluidizing medium F via all of the nozzles 15 is ensured. This results in a homogeneous fluidized bed.

In addition, outlet valves 72 for letting out condensate can be provided in the supply lines 64. This is expedient in particular if steam is used as the fluidizing medium.

The nozzle bottom arrangement 14 operates as follows:

One or more operating parameters of the fluidized bed dryer 10 are detected via a measuring device, for example by a pressure sensor 73 for measuring the chamber pressure p in the dryer chamber 11. The volumetric flow which is output via the first nozzles 15a and the volumetric flow which is output via the second nozzles 15b are adjusted and preferably regulated via the valve arrangement 22 in adaptation to the operating parameters or the resultantly derived operating state of the fluidized bed dryer 10. For this purpose, the volumetric flow is measured by the distributor lines 64 via the flow sensors 23. Via the nozzle bottom arrangement 14, the fluidizing medium F can be output into the dryer chamber 11 either only via the first nozzles 15a or only via the second nozzles 15b or via all of the nozzles 15a, 15b. The volumetric or mass flow of the fluidizing medium which is output via the first nozzles 15a and/or via the second nozzles 15b can be controlled or regulated via the activatable valve arrangement 22. Even if the valves 21, in the simplest case, are designed as switching valves which can be switched over only between the closed position and the open position, an at least two-stage or three-stage operation of the nozzle bottom arrangement 14 can thereby be achieved. For example, with the aid of proportional valves or pulse-width-modulated activation of the switching valves, the volumetric or mass flow can also be adjusted as desired between zero and a maximum value. Owing to the fact that the first nozzles 15a and the second nozzles 15b are distributed over the entire surface of the nozzle bottom segments 20, a homogeneous fluidized bed is produced in all types of operation of the nozzle bottom arrangement 14.

The invention relates to a nozzle bottom device 14 and to a method for operating the latter. The nozzle bottom arrangement 14 has a nozzle group with first nozzles 15a and a further nozzle group with second nozzles 15b. The two nozzle groups can be supplied independently of each other with a fluidizing medium. The respective volumetric flow can be switched on and off or can be adjusted variably. The first nozzles 15a and the second nozzles 15b are uniformly distributed over the entire surface of the nozzle bottom arrangement 14. As a result, a homogeneous fluidized bed is produced in the fluidized bed dryer 10 irrespective of whether only one of the nozzle groups 15a or 15b or all of the nozzles 15 is or are operated.

The invention claimed is:

1. A nozzle bottom arrangement for a dryer for drying solid particles, said arrangement comprising:
   at least one nozzle bottom segment which has a plurality of first nozzles and a plurality of second nozzles,
   wherein the first nozzles and the second nozzles are distributed over the surface of the nozzle bottom segment,
   wherein a fluidizing medium can be supplied to the first nozzles and the second nozzles independently of one another,
   the nozzle bottom segment having a plurality of nozzle bars which run substantially parallel to one another and on which first nozzles and second nozzles are in each case arranged,
   a first nozzle channel which runs in the nozzle bar and into which the first nozzles open, and a second nozzle channel which runs parallel to the first nozzle channel and into which the second nozzles open; and
   the nozzle bar defining a pipe, the two nozzle channels being separated fluidically from each other in the interior of the pipe by a partition.

2. The nozzle bottom arrangement according to claim 1, wherein the height of the nozzle bar is greater than the width thereof.

3. The nozzle bottom arrangement according to claim 1, wherein the number of first nozzles and the number of second nozzles on the nozzle bar is identical.

4. The nozzle bottom arrangement according to claim 1, wherein the nozzles are screwed onto the nozzle bar.

5. The nozzle bottom arrangement according to claim 1, wherein the first nozzles and the second nozzles are offset with respect to one another in the longitudinal direction of the nozzle bar.

6. The nozzle bottom arrangement according to claim 1, wherein the nozzle channels are fluidically closed at one end of the nozzle bar.

7. The nozzle bottom arrangement according to claim 1, further comprising a connecting piece, the connecting piece defining an outlet mouth, the nozzle bar having an inlet mouth which is connected fluidically to the outlet mouth of the connecting piece.

8. The nozzle bottom arrangement according to claim 7, wherein a first connecting channel connected fluidically to the first nozzle channel and a second connecting channel connected fluidically to the second nozzle channel run in the connecting piece.

9. The nozzle bottom arrangement according to claim 7, wherein the connecting piece has a first distributor line opening fluidically into the first connecting channel and a second distributor line opening into the second connecting channel.

10. The nozzle bottom arrangement according to claim 1, wherein the first nozzles are connected fluidically to a first distributor chamber and the second nozzles are connected fluidically to a second distributor chamber.

11. The nozzle bottom arrangement according to claim 10, wherein a supply line opens into the first distributor chamber and a further supply line opens into the second distributor chamber, in order to supply the distributor chambers with fluidizing medium.

12. The nozzle bottom arrangement according to claim 11, wherein the cross section of the distributor chamber tapers from the discharging point of the supply line in the direction of extension of the distributor chamber.

13. The nozzle bottom arrangement according to claim 11, wherein the supply lines of a plurality of distributor chambers open into a common supply chamber.

14. The nozzle bottom arrangement according to claim 1, wherein the volumetric flow of the fluidizing medium to the first nozzles is adjustable via a valve arrangement independently of the volumetric flow of the fluidizing medium to the second nozzles.

15. The nozzle bottom arrangement according to claim 11, further comprising a separately activatable valve arranged in each supply line.

16. The nozzle bottom arrangement according to claim 14, further comprising a separately activatable valve arranged in each supply line.

17. A method for operating a nozzle bottom arrangement of a dryer for drying ground solid particles, the nozzle bottom arrangement comprising at least one nozzle bottom segment which has a plurality of first nozzles and a plurality of second nozzles which are distributed over the surface of the nozzle bottom segment and which are fluidically separated from one another, the nozzle bottom segment having a plurality of nozzle bars which run substantially parallel to one another and on which first nozzles and second nozzles are in each case arranged, a first nozzle channel which runs in the nozzle bar and into which the first nozzles open, and a second nozzle channel which runs parallel to the first nozzle channel and into which the second nozzles open the nozzle bar defining a pipe, the two nozzle channels being separated fluidically from each other in the interior of the pipe by a partition, said method comprising:
supplying a fluidizing medium to the first nozzles and the second nozzles independently of one another,
determining at least one current operating parameter of the dryer, and
adjusting the flow of the fluidizing medium to the first nozzles and/or the flow of the fluidizing medium to the second nozzles in a manner adapted to the at least one operating parameter of the dryer.

* * * * *